Figure 1:
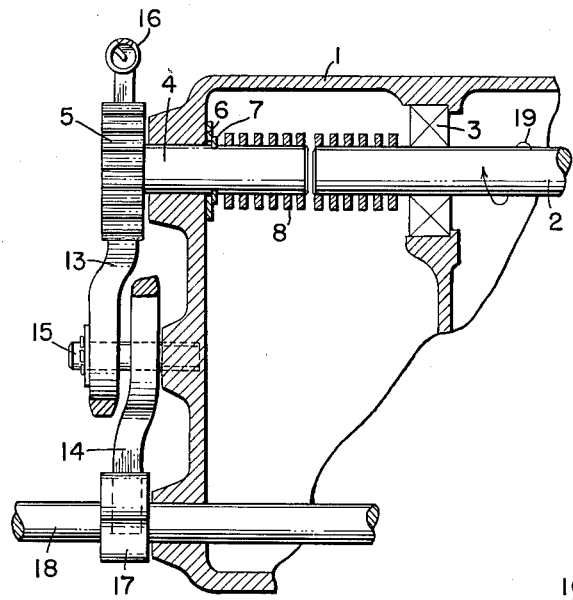

April 25, 1961   L. PÉRAS   2,981,388
ANTI-BACKING DEVICES FOR VEHICLES
Filed Jan. 29, 1959

INVENTOR
LUCIEN PÉRAS

BY *Stevens Davis Miller & Mosher*
ATTORNEYS

United States Patent Office 2,981,388
Patented Apr. 25, 1961

2,981,388

ANTI-BACKING DEVICES FOR VEHICLES

Lucien Péras, Billancourt, France, assignor to Regie Nationale des Usines Renault, Billancourt, France, a French works Filed Jan. 29, 1959, Ser. No. 789,963

Claims priority, application France Feb. 5, 1958

5 Claims. (Cl. 192—4)

This invention relates to anti-backing unidirectional devices for vehicles.

Many anti-backing devices for vehicles equipped with gearboxes comprising forward speeds and reverse have already been proposed, which consisted chiefly of a unidirectional or free-wheel device mounted between a stationary point and one gearbox shaft rotating constantly in the same direction relative to the engine. This shaft, of which the movement is generally bound up with that of the output shaft of the clutch, may be for example the intermediate or lay shaft, in the case of a conventional direct-drive gearbox having a constantly-driven lay-shaft.

This device serves the purpose of preventing the vehicle from running backwards when a forward gear is engaged, and from moving forwards when the reverse is engaged. It may be useful to momentarily suppress the action of this anti-backing device by means of a suitable control means within easy reach of the driver's hand, without it being necessary however to place the gear lever in the neutral position, for example when it is desired to allow a limited movement of the vehicle in the direction in which this movement is prevented by the anti-backing device.

Various devices have already been proposed to this end, but they are not fully satisfactory in that, assuming the vehicle to be still running, if the driver ceases from acting upon the means controlling the release of the anti-backing device, the latter will either re-engage itself with a shock most likely to subject the transmission members to instantaneous torques of dangerous value, or not re-engage itself if it is designed for operation only when the vehicle is at rest.

Now it is the essential object of this invention to provide an anti-backing device of the unidirectional coupling type, adapted to be rendered inoperative and operative at the driver's will, even when the vehicle is running, without any risk of applying a torque of dangerous value to the transmission members.

Figure 2:
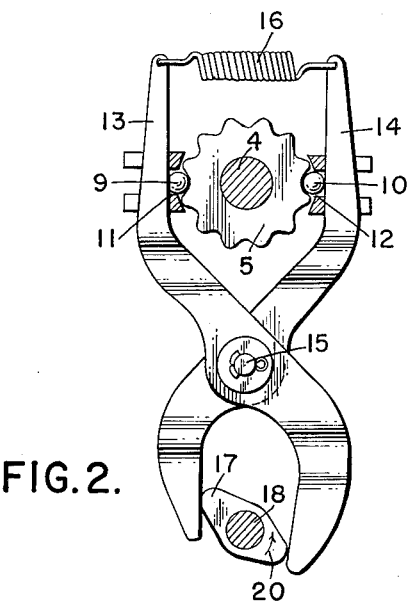

This invention will now be described with reference to the accompanying drawing illustrating diagrammatically by way of example a typical form of embodiment of the device constituting the subject-matter of this invention. In the drawing:

Figure 1 is a longitudinal fragmentary section showing an anti-backing device constructed in accordance with the teachings of this invention, the unidirectional coupling being particularly visible in this figure; and Figure 2 is an end view of the same device, as seen from the left-hand side of Fig. 1, showing more particularly the release and torque-limiting mechanism of the device.

In Fig. 1, the reference numeral 1 designates the gearbox case and 2 is the shaft rotatably fast with the output shaft of the clutch, of which the anti-backing device must permit the rotation only in one direction. The shaft 2 is carried by the case 1 through the medium of adequate bearings of which one is shown at 3.

A shaft 4 carrying a notched disc 5 is mounted in axial alignment with the shaft 2. This shaft 4 is journalled for free rotation in the case 1 and held therein through any adequate means, for example by means of a washer 6 and a spring ring or circlip 7.

On two co-extensive portions of same diameters of shafts 2 and 4 a spring 8 is mounted with a moderate clamping force, this spring consisting for example of rectangular-sectioned steel wire. According to a known expedient, the spring 8 will bind unidirectionally these shafts 2 and 4, thereby permitting their relative rotation when the latter tends to uncoil the spring, and preventing this relative rotation the other way.

Referring now to Figure 2, the disc 5 appears as being formed with regular peripheral notches of rounded configuration, engageable by balls 9, 10 guided in bores or recesses 11 formed in the case 1.

These balls 9, 10 are urged against the disc 5 by respective levers 13, 14 pivoted on a common pivot pin 15 also carried by the case 1; a tension spring 16 attached to the upper ends of these levers provides the necessary resilient force.

On the other hand, these levers 13 and 14 may be forced away from each other, against the resistance of spring 16, by control means for example in the form of a cam 17 mounted on a pin 18 journalled in the case 1; this cam, as shown, engages the free ends of levers 13, 14.

This device operates as follows:

Assuming firstly that the shaft 2 rotates in the direction of the arrow 19 while the vehicle is being driven by the engine, the spring 8 will not counteract its rotation if it is wound in the proper direction (that is, to the right in the example illustrated) and the vehicle motion will not be affected by the presence of the anti-backing device, as its drag torque in this direction is negligible.

If a forward speed is engaged and if the driver releases the clutch while the vehicle is still on a road uphill, the vehicle will tend to move backwards and therefore the shaft 2 will rotate in the direction opposite to that shown by the arrow 19. Under these conditions the self-tightening of the spring 8 will cause the torque received by the shaft 2 to be transmitted to the shaft 4 and therefore to the disc 5. As long as this torque does not exceed a certain value depending inter alia notably on the contour of the notches of disc 5, as well as on the force exerted by the spring 16, on the balls 9, 10, the disc 5 will be retained by the balls and the vehicle held against backward motion.

Should the driver then wish to permit a certain backward movement of the vehicle without shifting the gearbox control lever to neutral or reverse position (which might require an abnormal effort due to the torque exerted on the teeth or dogs of the gearbox), he just has to rotate the cam 17 in the direction of the arrow 20 (for example, by means of a suitable control means). Thus, the cam will separate the free ends of levers 13, 14 against the resistance of spring 16, thus releasing the balls 9, 10 and consequently the disc 5; under these conditions, the disc 5 driven from the shaft 2 may rotate in the direction corresponding to a backward movement of the vehicle.

If the driver releases the cam 17 of the anti-backing device without having stopped the vehicle completely beforehand, the balls 9 and 10 will again be urged towards the disc 5 by the levers 13, 14 responsive to the spring 16, thereby engaging opposite notches in the disc 5 and holding same against rotation. However, this holds true only within the limits set by the aforesaid factors (that is, the contour of the notches in disc 5 and the force exerted by the spring 16 on the balls), for the torque holding the disc 5 by means of balls 9 and 10. Should the reengagement of the anti-backing device occur when the vehicle runs at an excessive speed likely to apply dangerous torques to the transmission members, the balls 9 and 10 will be moved away by the disc 5 against the resistance of spring 16 so that the disc 5 will rotate through the number of notches necessary for enabling the torque of shaft 2 to resume a value below the predetermined value.

Of course, the form of embodiment shown and described herein should not be construed as limiting this invention as many modifications and alterations may be brought thereto without departing from the spirit and scope of the invention as set forth in the appended claims.

I claim:

1. Anti-backing device for vehicles, of the unidirectional coupling type permitting the free rotation of a transmission shaft rotating bodily with the output shaft of a clutch only in the direction in which this transmission shaft rotated when it is driven from the engine, comprising a shaft coupled to the output shaft of the clutch, a freely rotatable shaft, a unidirectional resilient means coupling said shaft and said rotatable shaft, a peripherally notched disc fixed to said rotatable shaft, stationary ball guide means, ball means engaging said notched disc and supported in said stationary guide means, a pair of jaw-forming levers operatively coupled to said ball means, a tension spring urging said pair of levers together to force said ball means toward the center of said notched disc, driver-actuated control means operatively coupled to said levers to move said ball means in said guide means away from said disc against the resistance of said spring to permit backward movement of the vehicle without disengaging the transmission shaft from the engine.

2. Anti-slip device for vehicles permitting the unidirectional rotation of a transmission shaft connected to the output shaft of a clutch, comprising a shaft connected to the output shaft of the clutch which is at all times driven in the same direction by the engine, a notched disc, means including a unidirectional coupling for operatively connecting said notched disc to said shaft to prevent displacement of the vehicle in an opposite direction than driven by the engine, holding means coacting with said notched disc to prevent rotation thereof, elastically responsive means operatively coupled to said holding means to provide a limited holding torque to the movement of said shaft in an opposite direction than the direction driven by the engine, and control means for actuating said elastically responsive means to permit limited movement of said shaft and vehicle in the opposite direction than the driven direction.

3. Anti-slip device according to claim 2 in which said holding means comprises a number of balls urged into said notched disc by said elastically responsive means.

4. Anti-slip device according to claim 3 in which said balls are housed in stationary guides adjacent said notched disc, said elastically responsive means comprising a pair of jaw-forming levers having a spring closure, and said control means operatively connected to each of said levers and adapted to be manually actuated.

5. Anti-backing device for vehicles, of the unidirectional coupling type permitting the free rotation of a transmission shaft rotating bodily with the output shaft of a clutch only in the direction in which this transmission shaft rotated when it is driven from the engine, comprising a shaft coupled to the output shaft of the clutch, a freely rotatable shaft, a unidirectional coupling connecting said shaft and said rotatable shaft, a peripherally notched disc fixed to said rotatable shaft, stationary ball guide means, ball means engaging said notched disc and supported in said stationary ball guide means, a pair of jaw-forming levers operatively coupled to said ball means, a tension spring urging said pair of levers together to force said ball means toward the center of said notched disc, driver-actuated control means operatively coupled to said levers to move said ball means in said guide means away from said disc against the resistance of said spring to permit backward movement of the vehicle without disengaging the transmission shaft from the engine.

References Cited in the file of this patent

UNITED STATES PATENTS

| | | |
|---|---|---|
| 1,719,157 | Wilson | July 2, 1929 |
| 1,720,007 | Schuler | July 9, 1929 |
| 1,827,720 | Lamb | Oct. 13, 1931 |
| 1,877,014 | Morgan | Sept. 13, 1932 |
| 2,653,690 | Saracchi | Sept. 29, 1953 |